US010132089B2

(12) United States Patent
Kormos

(10) Patent No.: US 10,132,089 B2
(45) Date of Patent: Nov. 20, 2018

(54) DEVICE FOR APPLYING COMPOUND TO A CORNER BEAD AND METHOD OF MAKING THE SAME

(71) Applicant: David Kormos, Calgary (CA)

(72) Inventor: David Kormos, Calgary (CA)

(73) Assignee: David Kormos, Alberta (CA)

( * ) Notice: Subject to any disclaimer, the term of this patent is extended or adjusted under 35 U.S.C. 154(b) by 0 days.

(21) Appl. No.: 15/410,372

(22) Filed: Jan. 19, 2017

(65) Prior Publication Data

US 2017/0204624 A1    Jul. 20, 2017

(30) Foreign Application Priority Data

Jan. 19, 2016    (CA) ...................................... 2918097

(51) Int. Cl.
| | |
|---|---|
| *E04B 1/00* | (2006.01) |
| *E04F 21/02* | (2006.01) |
| *E04F 21/00* | (2006.01) |
| *B29C 45/00* | (2006.01) |
| *B29K 105/26* | (2006.01) |

(52) U.S. Cl.
CPC ........ *E04F 21/026* (2013.01); *E04F 21/0053* (2013.01); *B29C 45/0001* (2013.01); *B29K 2105/26* (2013.01)

(58) Field of Classification Search
CPC ... E04F 21/026; E04F 21/0053; E04F 21/165; E04F 21/1657
See application file for complete search history.

(56) References Cited

U.S. PATENT DOCUMENTS

| | | | | |
|---|---|---|---|---|
| 2,623,497 | A | * | 12/1952 | Smith et al. ............ E04F 19/06 118/32 |
| 4,367,692 | A | * | 1/1983 | Underwood .............. B44C 7/04 118/415 |
| 5,169,449 | A | | 12/1992 | Raught |
| 7,111,811 | B2 | | 9/2006 | Weldy |
| 8,042,591 | B2 | | 10/2011 | Rosso et al. |
| 2005/0242249 | A1 | * | 11/2005 | Weldy ................... E04F 21/165 248/166 |
| 2007/0145207 | A1 | | 6/2007 | Weldy |
| 2007/0277475 | A1 | * | 12/2007 | Smythe ................... E04F 21/08 52/741.1 |
| 2009/0211185 | A1 | | 8/2009 | Rosso et al. |
| 2009/0260740 | A1 | * | 10/2009 | Teel ......................... B05C 3/18 156/71 |

* cited by examiner

*Primary Examiner* — Brian D Mattei
(74) *Attorney, Agent, or Firm* — Patterson Thuente Pedersen, P.A.

(57) ABSTRACT

A corner beading device and methods of using and manufacturing the same are provided. The device has a single fixed body defining: a cavity for receiving flowable material, an inlet sized and shaped to correspond to the size and shape of the corner bead cross section, an outlet opposite to the inlet shaped to correspond to the corner bead cross section, and of larger vertical size than the inlet, and a guide comprising at least one of a channel and a protruding ridge. To use the device, a user inserts a corner bead into the inlet, along the guide, and out the outlet, whereby the upper edge of the outlet scrapes off all but a thin, substantially uniform layer of flowable material from the surface of the corner bead. A method of manufacturing the device comprises the step of injection molding the single fixed body of the device.

7 Claims, 3 Drawing Sheets

DEVICE FOR APPLYING COMPOUND TO A CORNER BEAD AND METHOD OF MAKING THE SAME

RELATED APPLICATION

The present application claims priority to Canadian Application No. 2,918,097 filed Jan. 19, 2016, which is hereby incorporated herein in its entirety by reference thereof.

TECHNICAL FIELD

This invention is in the field of drywall construction tools, and more specifically to tools that apply joint compound to corner beads.

BACKGROUND

Gypsum, drywall, and other wall boards are typically crushable and brittle, meaning that their integrity can be diminished without proper reinforcement and they are prone to visible damage. Due to the fact they protrude, the corners of wall boards are particularly prone to dents and other damage. Additionally, drywall sheets do not typically come together perfectly at corners. Corners and clean lines are often the first things that people notice about a room and failing or uneven and rough corners leave a negative impression on a building's original design and build. As corners are also where the most damage occurs on drywall, they are important to put together properly with sufficient reinforcement to minimize damage.

In drywall construction, a corner bead is usually used to cover the corners of wall boards. The corner bead provides additional reinforcement and protection for the corner as well as covers an uneven union between the drywall sheets that form the corner. The use of a corner bead can provide for esthetically-pleasing clean corners and can minimize damage to drywall corners, the repair for which can be expensive and labour-intensive.

Corner beads are typically elongated strips of metal or plastic that are folded, curved, or angled along their longitudinal center line to produce a V-shaped or curved cross section, with the portions of the strip on both sides of the center line configured to be adhered to adjacent wall boards where they join at a corner. Sometimes L-shaped corner beads are used where the strip of metal or plastic is folded, curved, or angled at a position offset from the longitudinal center line. Corner beads are made with various angles and corner shapes, including right angles and rounded or "bullnose" corners and can be used for covering both inside (concave) and outside (convex) corners where wall panels meet.

To apply a corner bead to a drywall corner, drywall mud or joint compound is applied via spatula or the like along the relevant surface of the drywall, typically to both sides of the drywall outside corner from end to end and slightly beyond where the edge of the bead will be positioned. A thick layer of joint compound is applied to both sides of the corner and it is then smoothed off with a putty knife. The dry corner bead is then pressed against the coated corner, pressing it into the layer of drywall compound.

Alternatively, the joint compound can be applied directly to the corner bead first, and then the corner bead can be applied to the drywall corner. The conventional method of applying joint compound to corner beads is to do it by hand. To apply a corner bead to a concave corner, drywall mud or joint compound is applied to the outside (convex) faces of the corner bead. To apply a corner bead to a convex corner, joint compound is applied to the concave faces of the corner bead. In either case, the bead is then pressed against the corner, with the joint compound drying and forming an adhesive joint between the corner bead and the drywall corner.

The process of applying joint compound or drywall mud to the corner bead is labour-intensive, time-consuming and very messy, resulting in joint compound on hands, clothing, and other equipment. Additionally, it can be very difficult to apply an even, consistent thickness of joint compound to the corner bead without any dry spots or thin spots to which the corner bead may have difficulty adhering. Uneven or too much joint compound in some spots results in excessive extraneous joint compound oozing from between the wall board corner and the corner bead, and needing to be scraped off with a spatula so that the resulting corner is not uneven. Typically, a sponge, spatula and/or joint knife is used to clear away the excess by, for example, wiping down the corner bead by pressing the spatula against the bead and sliding downward while squeezing out the excess drywall compound. If the amount of joint compound used is very excess, the sponge, spatula, and/or joint knife will need to be cleaned frequently to avoid buildup. After excess joint compound is removed with a spatula or the like, the dry joint compound around the corner bead is then sanded until a smooth corner is achieved.

It can thus take a significant amount of time to apply joint compound to a corner bead and removing excessive amounts of joint compound can result in much mess and wasted time.

Devices meant to aid in applying joint compound to corner beads are typically difficult to clean and expensive. This is because these devices are usually complex with several moving parts. These devices must be cleaned every time they are to be reused, which can be difficult since drywall mud and joint compound dry relatively quickly, making removal difficult, and the various moving pieces and inserts can trap the drying joint compound. These devices must therefore be thoroughly cleaned and rinsed of joint compound before the compound sets and hardens, and before adding a new batch of joint compound.

Expensive devices with moving parts that are difficult to use and clean, making them one-time-use only, are not ideal for the average homeowner or a person interested in do-it-yourself home renovation.

SUMMARY

It would be advantageous to have a cost-effective device for applying drywall taping compound to a corner bead to efficiently complete a taping job.

In an aspect, a corner beading device for depositing flowable material onto a corner bead is provided. The corner beading device comprises a single fixed body defining: a cavity for receiving the flowable material, an inlet disposed at a lower end of the body and sized and shaped to correspond generally to the size and shape of the corner bead cross section, an outlet disposed at the lower end of the body at a diametrically opposed side of the body to the inlet, shaped to correspond generally to the corner bead cross section, and of larger vertical size than the inlet, and a guide comprising at least one of a channel and a protruding ridge corresponding generally to the shape of lower lips of the inlet and the outlet and extending from the inlet to the outlet adjacent the bottom of the cavity.

In a further aspect, a method of depositing flowable material onto a corner bead is provided. The method comprises the steps of providing a corner beading device comprising a single fixed body defining: a cavity for receiving the flowable material; an inlet disposed at a lower end of the body and sized and shaped to correspond generally to the size and shape of the corner bead cross section; an outlet disposed at the lower end of the body at a diametrically opposed side of the body to the inlet, shaped to correspond generally to the corner bead cross section, and of larger vertical size than the inlet; and a guide comprising at least one of a channel and a protruding ridge corresponding generally to the shape of lower lips of the inlet and the outlet and extending from the inlet to the outlet adjacent the bottom of the cavity, and inserting a corner bead into the inlet, along the guide, and out through the outlet, whereby as the corner bead exits the outlet, the upper edge of the outlet scrapes off all but a thin, substantially uniform layer of the flowable material from the upper surface of the corner bead.

In yet a further aspect, a method of manufacturing a corner beading device is provided. The method comprises the steps of injection-molding a single fixed body defining: a cavity for receiving the flowable material; an inlet disposed at a lower end of the body and sized and shaped to correspond generally to the size and shape of the corner bead cross section; an outlet disposed at the lower end of the body at a diametrically opposed side of the body to the inlet, shaped to correspond generally to the corner bead cross section, and of larger vertical size than the inlet; and a guide comprising at least one of a channel and a protruding ridge corresponding generally to the shape of lower lips of the inlet and the outlet and extending from the inlet to the outlet adjacent the bottom of the cavity.

The device for applying joint compound to a corner bead and method of making the same can allow for a relatively cheap and clean taping job by providing a low-cost device used to apply joint compound to a corner bead rather than applying the same by hand. The device can avoid the need to manually spread joint compound on the corner bead with a spatula or the like, which can allow for a much cleaner approach to applying joint compound to the corner bead and can cut down on the labour and time required to apply joint compound to the corner bead. The device can be manufactured with no moving parts so it is cost-effective to manufacture.

The above summary is not intended to describe each illustrated embodiment or every implementation of the subject matter hereof. The figures and the detailed description that follow more particularly exemplify various embodiments.

BRIEF DESCRIPTION OF THE DRAWINGS

While the invention is claimed in the concluding portions hereof, example embodiments are provided in the accompanying detailed description which may be best understood in conjunction with the accompanying diagrams where like parts in each of the several diagrams are labeled with like numbers, and where:

Figure 1:
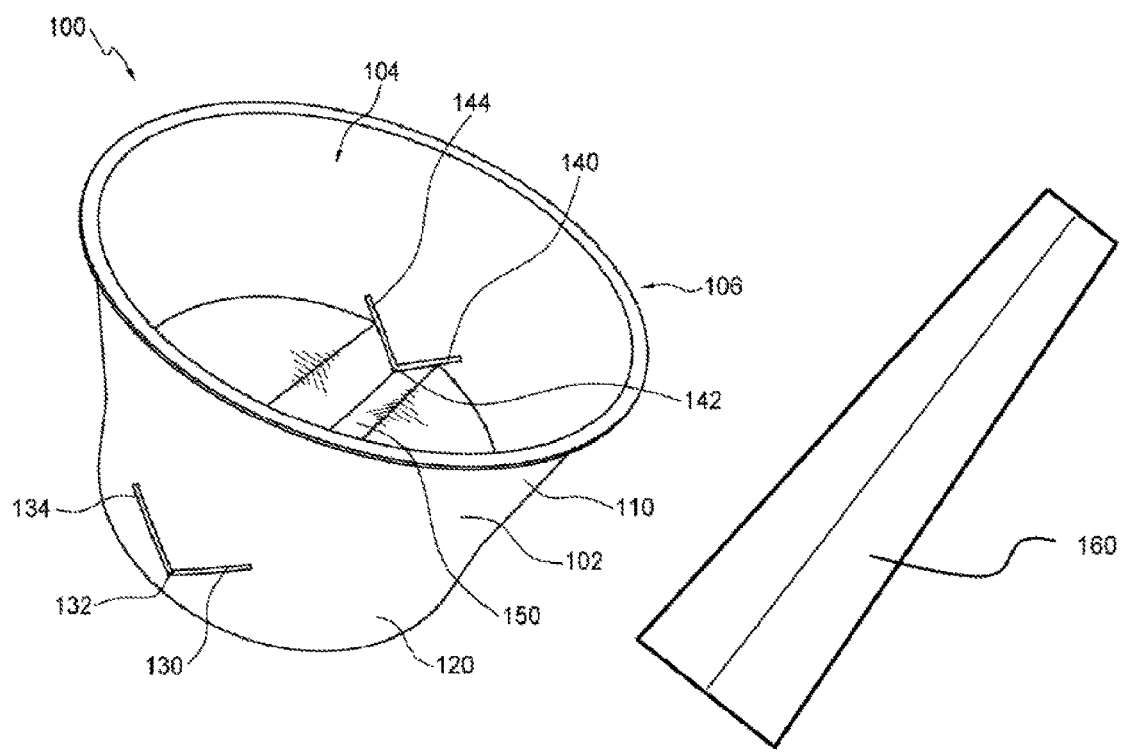
FIG. 1 is a perspective view of a corner beading device in an aspect.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

A corner beading device is provided. The corner beading device is used for depositing material such as joint compound or drywall mud onto a face of a corner bead prior to its attachment to joints or corners between adjacent wall panels. The device could be used for wallboard, gypsum, or drywall corner beads. These corner beads could be metal beads, or paper-faced beads with a paper face allowing better adhesion to joint compounds and can be used to apply joint compound or drywall mud onto either outside or inside corner beads. The device could reduce the time required to apply joint compound to corner beads and could provide for a cleaner process.

FIG. 1 illustrates a corner beading device 100 in an aspect. Corner beading device 100 comprises a single body 102 defining a cavity 104 for holding a quantity of flowable material and an open top end 106 for receiving the flowable material. The flowable material can be joint compound or drywall mud to be applied to a corner bead.

The body 102 could in some cases be a single, injection-molded base. The body 102 could be made out of any rigid materials, such as metal, plastic or high-strength paper or cardboard. In some aspects, the body 102 is made out of recycled and/or recyclable materials such as plastic or high-strength cardboard to allow for the device to be environmentally friendly and more affordable. In some aspects the body 102 could be made out of recycled bottles and/or milk jugs. The general shape of the body 102 shown in FIG. 1 is frusto-conical so as to allow a plurality of the devices 100 to be stackable within one another for easy storage and shipping. While the perimeter of the body 102 is circular in shape, in other aspects, the perimeter of the body could be rectangular or square in shape, or any other convenient shape, with the total length of the perimeter of the device tapering from top to bottom of the device to still allow for stacking and easy shipping and storage. As there is only a single body 102 with no moving parts, stacking of the devices 100 can easily occur with the outside face of the body 102 of one device 100 sitting substantially flush with the inner face of the body 102 in the cavity 104.

Device 100 also has an upper end 110 and a lower end 120. An inlet 130 can be disposed adjacent the lower end 120 of the body 102 and can be sized and shaped to correspond generally to the size and shape of the cross section of the corner beads to be used therewith, while allowing the corner beads to pass therethrough from outside the body 102 and into the cavity 104. An outlet 140 can also be disposed adjacent the lower end 120 of the body 102 at a diametrically opposed side of the body 102 to the inlet 130, shaped to correspond generally to the shape of the corner bead, and of larger vertical size than the inlet 130 to allow the corner beads covered with a layer of joint compound to pass therethrough from the cavity 104 to the outside of the body 102. The inlet 130 and outlet 140 could each comprise a slot in the walls on opposite sides of the device 100 that are aligned with one another and are in fluid communication with the cavity 104, forming a passageway through which the corner beads may pass.

A guide 150 comprising at least one of a channel and a protrusion or ridge corresponding generally to the shape of the bottom lips 132, 142 of the inlet 130 and the outlet 140, respectively, can also be provided connecting the bottom lip 132 of the inlet 130 to the bottom lip 142 of the outlet 140. The shapes and sizes of the guide 150, inlet 130, and outlet 140 can be selected according to the size and shape of the corner beads to be used therewith, with the general shape of the lower lip 132, 142, and guide 150 comprising a ridge or protrusion corresponding generally to the cross-sectional shape of the corner beads to be used therewith. For example, the shape of the lower lips 132, 142 and channel guide 150 in FIG. 1 correspond to a right-angled corner bead, while the shape of the lower lips 232, 242 and channel guide 250 in FIG. 2 correspond to a bull-nose or rounded corner bead.

The inlet 130 and outlet 140 are sized and shaped to accommodate the corner beads passing therethrough, with the upper edges 134, 144 of the inlet 130 and outlet 140, respectively, being a set distance apart from the lower lips 132, 142 of the inlet 130 and outlet 140, respectively, such that when a corner bead is fed through the inlet 130 and outlet 140, the bottom face of the corner bead can lie substantially flush with the guide 150. The vertical distance between the lower lip 142 of the outlet 140 and the upper edge 144 of the outlet 140 defines the amount of joint compound or other material dispensed onto the corner bead by providing a clearance between the corner bead and the upper edge 144 of the outlet 140. As the corner bead is fed through the device 100, the upper edge 144 of the outlet can make contact with the joint compound or other material deposited onto the corner bead and scrapes the desired amount of compound off the top of the corner bead.

In an aspect, the inlet 130 is fixed with a shorter vertical opening than the outlet 140 so that the corner bead can fit through the inlet 130 with minimal or no clearance between the top of the corner bead and the upper edge 134 of the inlet 130. This can minimize the amount of flowable material that can seep out of the inlet 130 when a corner bead is not passing therethrough. The outlet 140 can allow for some clearance between the top of the corner bead and the upper edge 144 of the outlet 140 to allow the upper edge 144 of the outlet 140 to define the amount of joint compound dispensed onto the corner bead and such that the joint compound is dispensed substantially onto only one face of the corner bead. In some aspects, the inlet 130 could comprise a fixed ⅛ inch slot, while the outlet 140 comprises a fixed 3/16 inch slot.

A corner beading device could be used for the application of joint compound on either an inside or outside corner bead. For example, the devices 100 and 200 shown in FIGS. 1 and 2 could be used for the application of joint compound to an outside corner bead, with material being deposited onto the concave face of the corner bead when the corner bead is passed through the inlet 130, 230, along the guide 150, 250 in the shape of a channel, and out the outlet 140, 240. On the other hand, the device 300 shown in FIG. 3 could be used for the application of joint compound on an inside corner bead, with material being deposited onto the convex face of the corner bead when the corner bead is passed through the inlet 330, along the guide 350, and out the outlet 340, simply by inverting the inlet 330 and outlet 340 from a downward facing apex to an upward facing apex and by changing the shape of the guide 350 to be a protruding ridge rather than a channel.

Referring again to FIG. 1, the inlet 130 and outlet 140 could be releasably sealable to allow a batch of unused joint compound or drywall mud to be stored without setting and/or to prevent the flowable material from flowing out of the inlet 130 and outlet 140 when the device 100 is full of flowable material, but the device 100 is not in use. In an aspect, sealing lugs could be provided that act as stoppers or air plugs to releasably seal the inlet 130 and outlet 140 by plugging the sealing lugs into the inlet 130 and outlet 140. The sealing lugs could be sized according to the sizes of the inlet 130 and outlet 140. The cross section of the sealing lugs could be generally sized and shaped to releasably seal the inlet 130 and outlet 140, but could be peg-shaped to allow for easier insertion into the inlet 130 and outlet 140. The lugs could be made out of a resilient rubber material, foam rubber, cork, plastic or any other type of resilient material, or in some cases could be made out of a plastic, wood, or metal or other rigid material that can snap into place in the inlet 130 and outlet 140. There could be separate sealing lugs for the inlet 130 and outlet 140, with the outlet sealing lug being larger in size than the inlet sealing lug. In another aspect, a sealing strip 160 can be provided that comprises a tapering elongate strip that can obstruct both the inlet 130 and the outlet 140 when the smaller side of the elongate strip is slid through the outlet 140, along the guide, and through the inlet 130 to plug the inlet 130, while the other side of the elongate strip plugs the outlet 140. In yet a further aspect, rivets could be made above the inlet 130 and outlet 140 for allowing a strip of material to be slid down the side of the device 100 to cover the inlet 130 and outlet 140.

A lid could optionally be secured adjacent the upper end 110 to close off the open top 106 of the cavity 104 when the corner beading device 100 is not in use. The lid could also be used with the device 100 while in use, to prevent too-quick drying of the compound or flowable material in the device 100. The lid could, in some cases, have an air inlet to allow air to move into the cavity 104 as compound moves out of the cavity 104 onto the corner bead and out the outlet 140.

In some aspects, injection-molded hand holds can be disposed on the sides of the device 100 to make the device 100 easier to carry.

Figure 2:
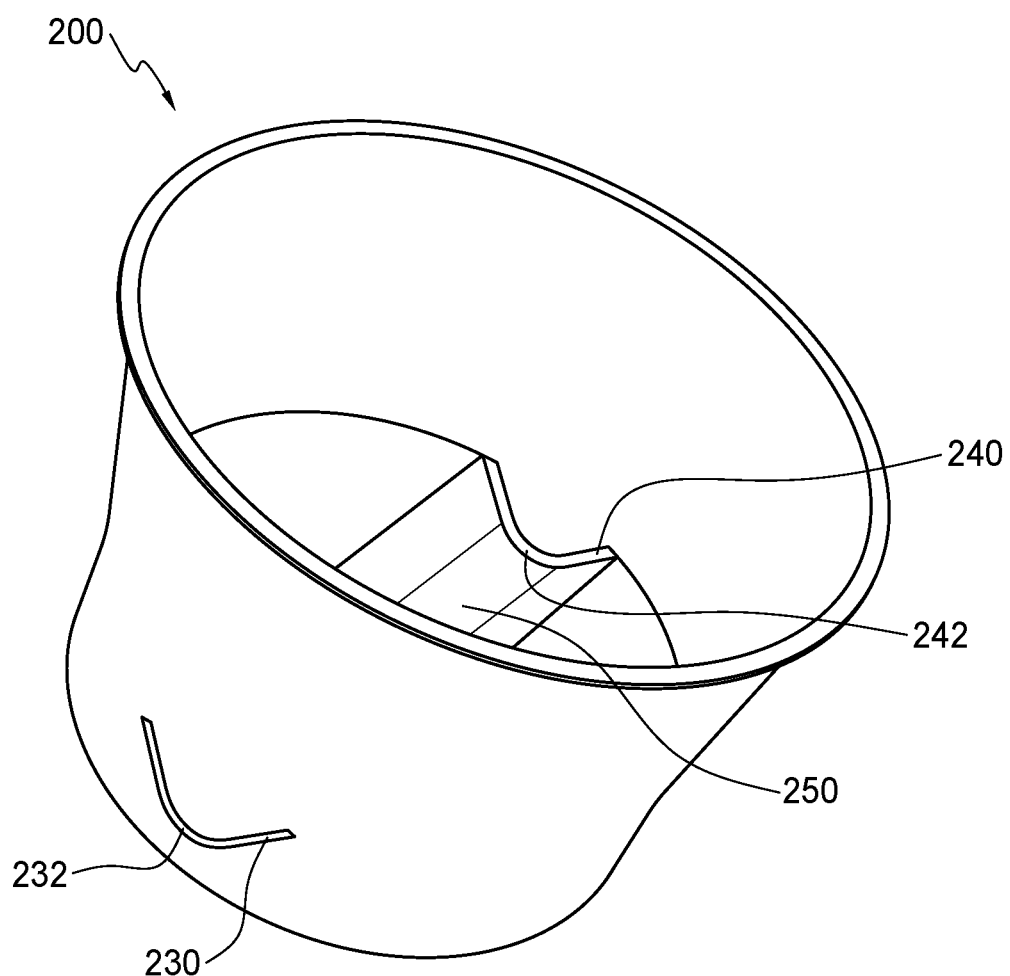
FIG. 2 is a perspective view of a corner beading device in a further aspect.
Figure 3:
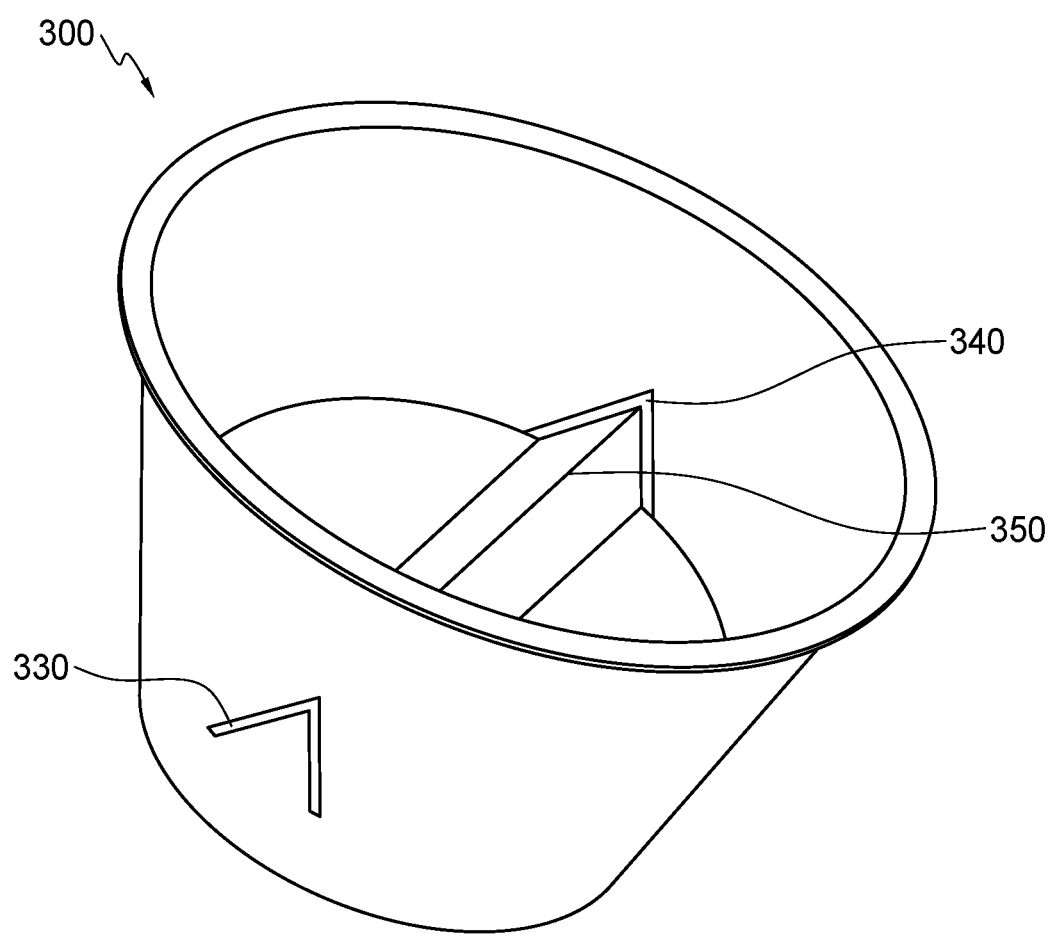
FIG. 3 is a perspective view of a corner beading device in yet a further aspect.

A stabilizing base for engaging the lower end 120 of the paper beading device 100 to provide stability to the device 100 can be provided in some cases. The base could provide additional stability to the device 100 while the device 100 sits on a flat surface such as the floor or an elevated surface such as a table. The base could sit around the perimeter of the lower end 120 of the device 100 to minimize movement of the device 100 while corner beads are being pushed through the device 100. In some cases, the base might be a cradle that engages the lower end 120 of the corner beading device 100 to keep it steady. The base could comprise grips on its lower face to grip surfaces upon which the device 100 and/or base might sit. In some aspects, the device 100 could be manufactured as shown in FIGS. 1 and 2 with a flat bottom, such that no additional stability is required, and thus no stand is required. In some aspects, grips such as suction devices or adhesives could be provided on the bottom face of the device 100 to provide stability to the device as a corner bead is moved through the device 100. In another aspect, a stand could be provided upon which the device 100 could sit and provide both added vertical height so a user does not need to bend down to use the device 100, as well as provide added stability to the device 100. The device 100 could be releasably secured to the stand.

In use, a user fills the device 100 with drywall taping compound or joint compound. The user then slides a dry corner bead through the inlet 130, along the guiding channel or ridge 150, as the case may be, and out through the outlet 140. As the user does so, the corner beading device 100 could apply joint or mud taping compound to an upper face of the corner bead. The guide 150 can allow a user to simply follow the channel or ridge 150, without needing to feel around or guess where the outlet 140 is after the corner bead enters the inlet 130. The corner bead can be fed through the inlet 130 by pushing the corner bead into the inlet 130, and as it exits the outlet 140, the user can pull the corner bead out through the outlet 140. As the corner bead passes through the passageway formed by the inlet 130, guide 150, and outlet 140, a coating of joint compound can be applied to the corner bead, with the guide 150 acting as a guide or track for the corner bead to pass from the inlet 130 to the outlet 140. As the corner bead exits the outlet 140, the upper edge 144 of the outlet 140 can scrape off all but a thin layer of the joint compound from the surface of the corner bead. In this way, a thin, substantially uniform layer of joint compound can be deposited onto the corner bead in a relatively quick and easy process. As the corner bead exits the device 100, it is pre-coated with drywall taping compound, so a user can place the pre-coated corner bead on the drywall corner and use a spatula, taping knife, putty knife, or the like to wipe down any excess drywall compound from the behind the corner bead.

A method of manufacturing a corner beading device is also provided. The method comprises the step of injection-molding a single body defining a cavity and an open top end. The body could be made out high-strength plastic which could be recycled plastic and/or could be recyclable. The general shape of the body can be frusto-conical so as to allow a plurality of the bodies to be stackable within one another for easy storage and shipping. The perimeter of the body could be made in a circular shape or could be rectangular or square in shape, with the total length of the perimeter of the device tapering from top to bottom of the device to still allow for stacking and easy shipping and storage. The corner beading device can be manufactured with an upper end and a lower end. An inlet can be made adjacent the lower end of the body and can be sized and shaped to correspond generally to the size and shape of the cross section of the corner beads to be used therewith. An outlet can be made adjacent the lower end of the body at a diametrically opposed side of the body to the inlet, shaped to correspond generally to the shape of the corner bead, and of larger vertical size than the inlet. A guide 150 comprising at least one of a channel and a protrusion or ridge corresponding generally to the shape of the bottom lips of the inlet and the outlet can be formed in the body. The shapes and sizes of the guide, inlet, and outlet can be manufactured according to the size and shape of the corner beads to be used therewith and the amount of joint compound desired to be used with the corner bead. The vertical distance between the lower lip of the outlet and the upper edge of the outlet can be made so as to define the amount of joint compound or other material dispensed onto the corner bead by providing a clearance between the corner bead and the upper edge of the outlet. In some aspects, injection-molded hand holds can be made on the sides of the device.

The device described herein can allow for increased efficiency and cleanliness of applying compound to corner beads, and the method of manufacturing the device can allow for cheaper manufacturing costs and simplicity. The resulting device can save time and can allow for cleaner and easier application of joint compound to corner beads. It can also be cheaper because of the lack of moving parts, and can in some cases be recycled or thrown away when a taping project is completed.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A corner beading device for depositing flowable material onto a corner bead, the corner beading device comprising:
    a single fixed body defining:
        a cavity for receiving the flowable material;
        an inlet disposed at a lower end of the body and sized and shaped to correspond generally to the size and shape of the corner bead cross section;
        an outlet disposed at the lower end of the body at a diametrically opposed side of the body to the inlet, shaped to correspond generally to the corner bead cross section, and of larger vertical size than the inlet; and a guide comprising at least one of a channel and a protruding ridge corresponding generally to the shape of lower lips of the inlet and the outlet and extending from the inlet to the outlet adjacent the bottom of the cavity; and a sealing strip comprising a tapering elongate strip that obstructs both the inlet and the outlet when the smaller side of the elongate strip is slid through the outlet, along the guide, and at least partially through the inlet.

2. The corner beading device of claim 1 wherein the body is injection-molded.

3. The corner beading device of claim 1 wherein the body is made out of recyclable materials.

4. The corner beading device of claim 1 wherein the body is made out of recycled materials.

5. The corner beading device of claim 1 wherein a length of the perimeter of the corner beading device tapers from top to bottom, and whereby a plurality of the corner beading devices are nestable and stackable with one another.

6. The corner beading device of claim 5 wherein the body is generally frusto-conical.

7. The corner beading device of claim 1 wherein the inlet comprises a ⅛inch slot and the outlet comprises a 3⁄16inch slot.

* * * * *